US005138336A

United States Patent [19]

Goto

[11] Patent Number: 5,138,336

[45] Date of Patent: Aug. 11, 1992

[54] THERMAL PRINTER HAVING THERMAL HEADS WITH ADJUSTABLE OVERLAP

[75] Inventor: Hideo Goto, Tokyo, Japan

[73] Assignee: Mutoh Industries Ltd., Tokyo, Japan

[21] Appl. No.: 596,324

[22] Filed: Oct. 12, 1990

[30] Foreign Application Priority Data

Oct. 25, 1989 [JP] Japan .................................. 1-277732

[51] Int. Cl.⁵ .......................... G01D 15/10; B41J 2/32

[52] U.S. Cl. ................................ 346/76 PH; 400/120; 400/82; 346/145

[58] Field of Search ............. 346/76 PH, 145; 400/82, 400/120 MC

[56] References Cited

U.S. PATENT DOCUMENTS

| | | | |
|---|---|---|---|
| 4,660,052 | 4/1987 | Kaiya et al. | 346/76 PH |
| 4,848,941 | 7/1989 | Imaseki | 400/82 |
| 4,946,297 | 8/1990 | Koike et al. | 400/82 |
| 4,977,410 | 12/1990 | Onuki et al. | 346/76 PH |

FOREIGN PATENT DOCUMENTS

| | | | |
|---|---|---|---|
| 0055156 | 3/1987 | Japan | 400/82 |
| 0244659 | 10/1987 | Japan | 400/82 |
| 0128956 | 6/1988 | Japan | 400/82 |
| 63-166428 | 10/1988 | Japan . | |

*Primary Examiner*—Mark J. Reinhart
*Assistant Examiner*—Huan Tran
*Attorney, Agent, or Firm*—Oblon, Spivak, McClelland, Maier & Neustadt

[57] ABSTRACT

A plurality of thermal heads each having a resistance heating element array are provided for a single platen roller. The individual thermal heads are arranged away from one another in the axial direction of the platen roller in such a way that regions in which images are recorded by their respective heating element arrays overlap each other at the joint portion of said regions. The thermal heads are also spaced away from one another in the circumferential direction of the platen roller so as to avoid mutual interference. The above arrangement makes it possible to use only a single platen roller for a recording apparatus which performs recording in a large recording area, thus contributing to making the apparatus compact.

7 Claims, 8 Drawing Sheets ( PROR ART )

THERMAL PRINTER HAVING THERMAL HEADS WITH ADJUSTABLE OVERLAP

BACKGROUND OF THE INVENTION

The present invention generally relates to a thermal recording apparatus, such as a heat-sensitive recording apparatus and a thermal transfer recording apparatus, more particularly, to a thermal recording apparatus suitable for recording data on a large recording sheet.

Conventionally, in an automatic CAD (Computer Aided Design) machine or the like which draws a diagram on a large recording sheet of size A0 or A1, for example, a thermal recording apparatus, which employs an in-line type thermal head having an array structure, is used because of high-speed drawing, lower noise and easier maintenance, as well as a so-called pen plotter. However, the practical use of elongated thermal heads designed to cope with sizes A0 and A1 is not easy because they have a low production yield, thus increasing the manufacturing cost, and a low maintainability. In this respect, a plurality of commercially available heads for size A3 are connected in the line direction to ensure data recording on a large area, such as size A0 or A1. In this case, it is necessary to secure the continuity of a recording image at the jointed portion between the thermal heads.

In a conventional thermal recording apparatus, as shown in FIG. 1, there are a plurality of platen rollers 61 and 62 (the two in the illustrated example) located adjacent to each other with their axial directions being in parallel to each other, and thermal heads 63 and 64 are respectively provided at the platen rollers. Thermal heads 63 and 64 are located in parallel to respective platen rollers 61 and 62 in such a way that they can make contact with the platen rollers at their resistance heating elements 65 and 66 and can move away therefrom. In addition, thermal heads 63 and 64 are located at opposite sides in the axial directions of platen rollers 61 and 62 so that effective recording regions A and B determined by heating elements 65 and 66 become continuous in the line direction, i.e., in the longitudinal directions of the thermal heads. Heating elements 65 and 66 are selectively driven while moving continuous recording sheet 67 in the arrowhead direction in FIG.1, so that thermal head 63 records an image on region A side and thermal head 64 records an image on region B side.

However, the above-described conventional thermal recording apparatus requires that a plurality of platen rollers be provided in association with the individual thermal heads, which inevitably enlarges the apparatus and increases the manufacturing cost.

SUMMARY OF THE INVENTION

Accordingly, it is the object of the present invention to provide a thermal recording apparatus which can be made compact and can reduce the manufacturing cost.

A thermal recording apparatus according to the present invention comprises:

a platen roller;

a plurality of thermal heads located away from each other in a circumferential direction and an axial direction of the platen roller, with each having a resistance heating element array; and head supporting means for positioning the thermal heads in such a way that regions in which the heating element arrays perform recording, overlap at the joint portions of said regions in the axial direction of the platen roller.

According to this invention, a plurality of thermal heads are mounted, away from each other in the circumferential direction as well as the axial direction of a single platen roller, whereby these thermal heads can be mounted without any spatial interference to each other with respect to the single platen roller. This can reduce the number of platen rollers required by the prior art. In addition, as the thermal heads are located around a single platen roller, the space occupied by the head portions can be significantly reduced for more effective use of the space. These features can reduce the number of the required components as well as make the recording apparatus considerably make compact, thus contributing to a reduction in manufacturing cost.

BRIEF DESCRIPTION OF THE DRAWINGS

FIGS. 2 through 5 illustrate the structure of the thermal recording apparatus according to the first embodiment of the present invention in which FIG. 2 is a perspective view illustrating the essential portion of the apparatus extracted, FIG. 3 is a perspective view of a supporting device for a thermal head, FIG. 4 is a perspective view illustrating the outline of this apparatus, and FIG. 5 is a side cross section illustrating the interior of this apparatus;

DETAILED DESCRIPTION OF THE PREFERRED EMBODIMENTS

Preferred embodiments of this invention will now be described referring to the accompanying drawings.

First, a thermal recording apparatus according to the first embodiment of the present invention will be described referring to FIGS. 2 through 5.

Figure 4:
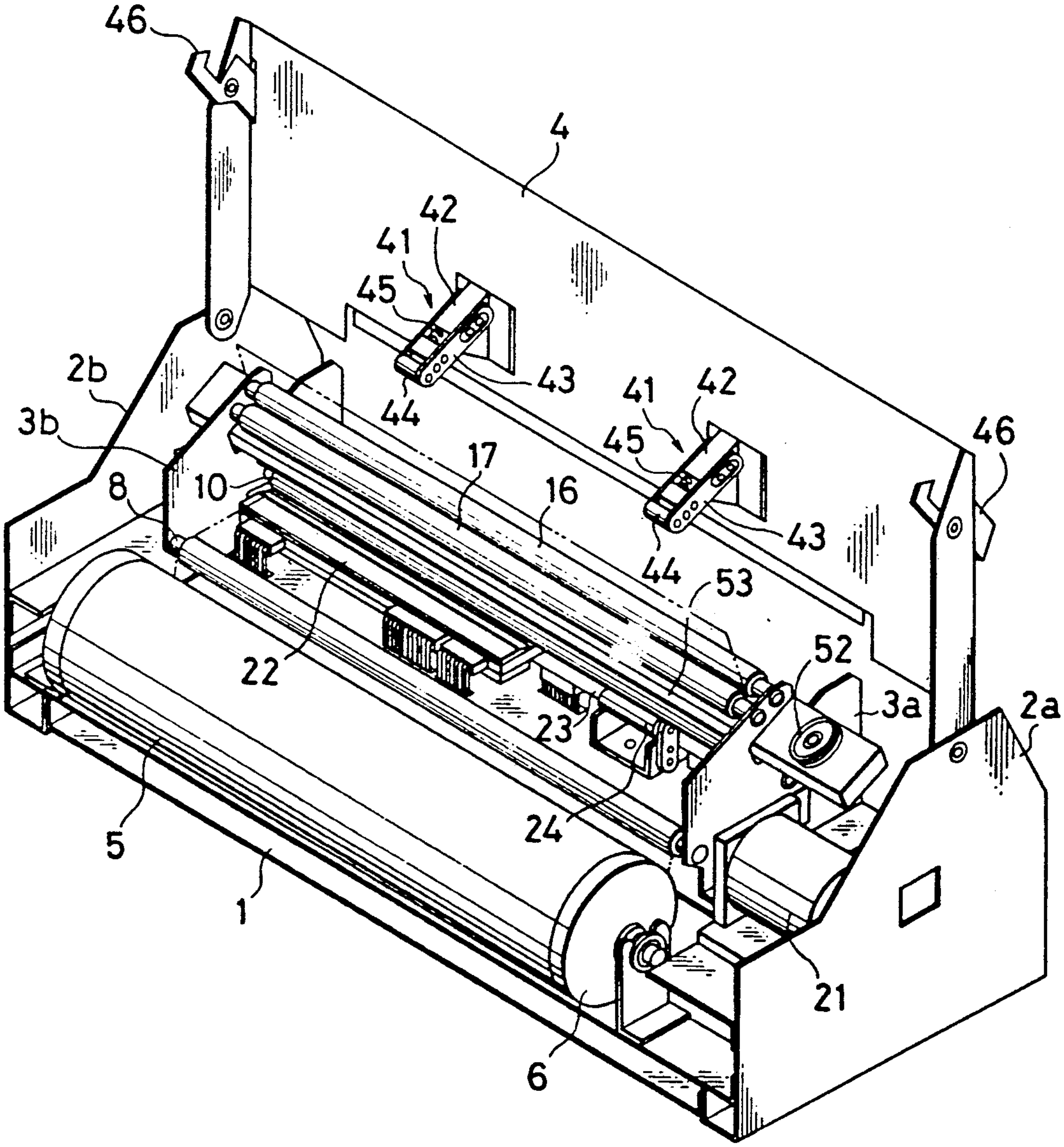
Figure 5:
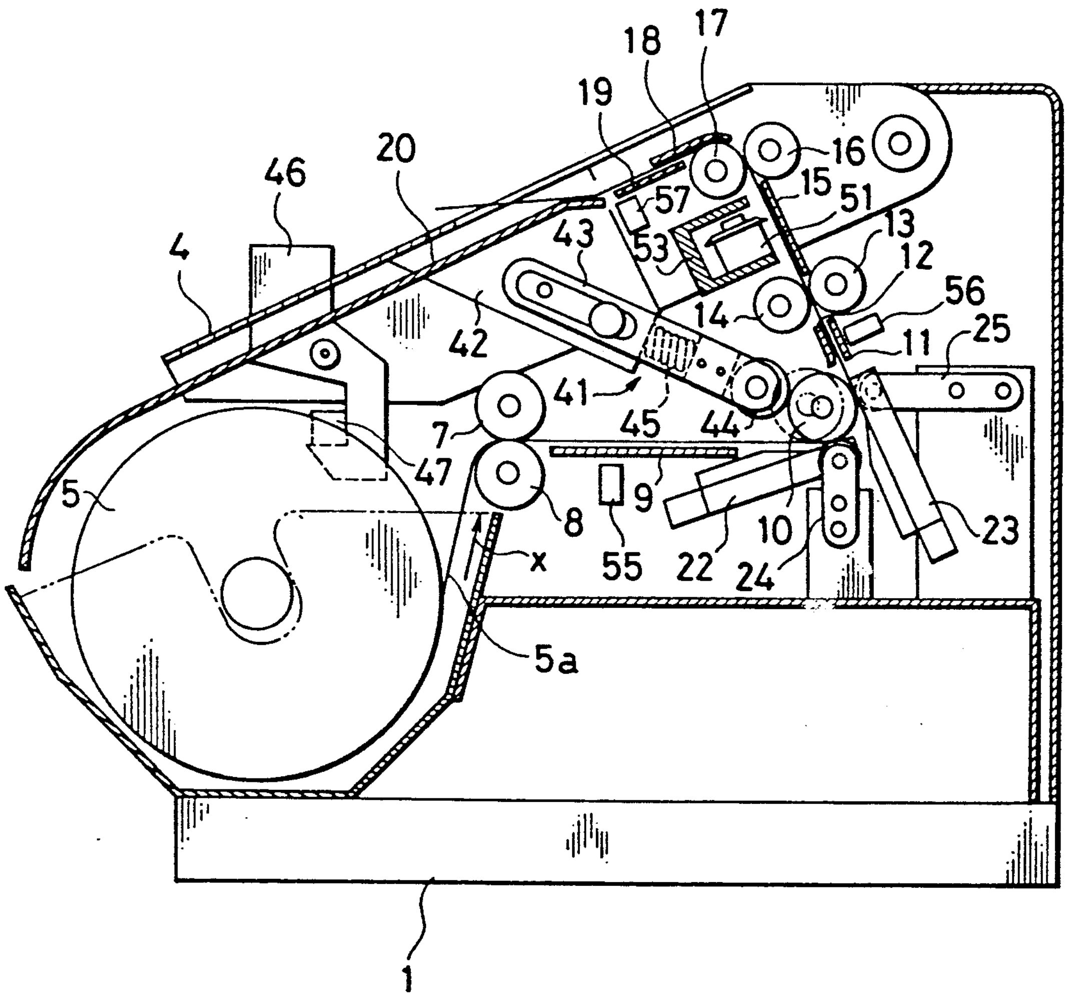

As shown in FIGS. 4 and 5, case housing 1 accommodates a recording mechanism, and has side walls 2*a* and 2*b* provided on the respective sides between which a line for feeding a recording sheet in the direction of the arrow x is defined. Upper cover 4 is mounted on the upper portions of side walls 2*a* and 2*b* so as to open and close. Case housing 1 accommodates roll 5 of continuous recording sheet 5*a* attached to holders 6, upstream of the recording sheet feeding direction (arrow x).

Paper 5*a* has a width to provide a regular sheet of, for example, size A1 when cut after the image recording is done.

A pair of feed rollers 7 and 8 are located downstream of continuous recording sheet roll 5 in the feeding direction x of sheet 5*a*. Further downstream of feed rollers 7 and 8 in the recording sheet feeding direction x, flat guide 9 that extends horizontally is located. Platen roller 10 is located further downstream of guide 9. Above platen roller 10 lie guides 11 and 12, feed rollers 13 and 14, guide 15, feed rollers 16 and 17, guides 18 and 19, and guide 20 arranged in the sheet feeding direction x in named order. Each of rollers 7, 8, 10, 13, 14, 16 and 17 is disposed with its axial direction in horizontal and normal to the aforementioned recording sheet feeding direction (in the direction of the arrow x).

As shown in FIGS. 4 and 5, side plates 3*a* and 3*b* are provided at the proper distances away from side walls 2*a* and 2*b*, respectively, behind continuous recording sheet roll 5 in housing 1. Feed rollers 7, 8, 13, 14, 16 and 17 and platen roller 10 are supported rotatably by side plates 3*a* and 3*b*. Motor 21 is provided between side wall 2*a* and side plate 3*a*, and the driving force of motor 21 is transmitted to feed rollers 7, 8, 13, 14, 16 and 17 and platen roller 10 via a transmission mechanism (not shown).

Figure 2:
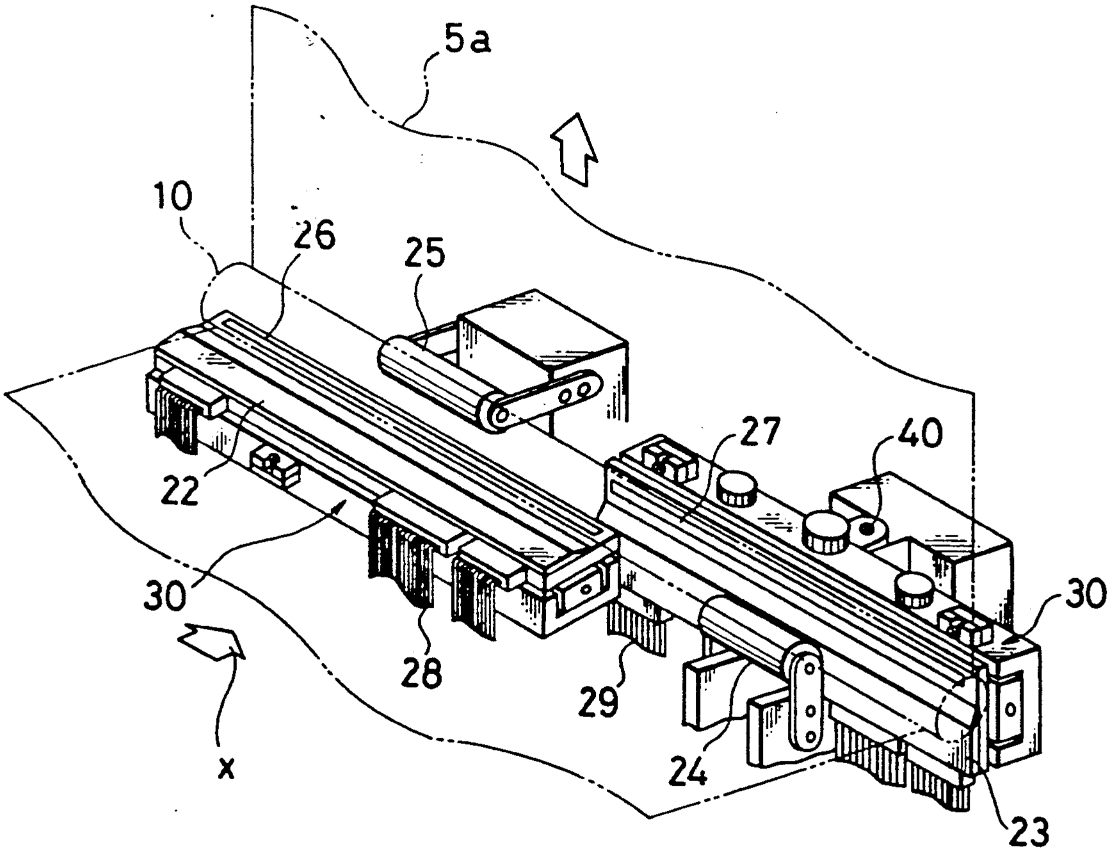

As shown in FIG. 2, thermal heads 22 and 23 each having a recording region of size A3 and pressure rollers 24 and 25 are arranged around platen roller 10. Thermal head 22 is located to contact the lower portion of platen roller 10, and other thermal head 23 to contact the side portion of platen roller 10 behind it. In other words, thermal heads 22 and 23 are arranged in such a way that their faces on which heating element arrays 26 and 27 are respectively provided cross at an angle of approximately 90°. Thermal head 22 is located on the left side as viewed from the recording sheet feeding direction (arrow x) with respect to platen roller 10, and thermal head 23 on the right side. Those regions of thermal heads 22 and 23 which make contact with platen roller 10 overlap each other in the axial direction of platen roller 10, so that the recording regions of respective heating element arrays 26 and 27 overlap at the joint portion of the . ording regions in this axial direction of the platen roller or in the line direction. These thermal heads 22 and 23 are connected via respective flexible cables 28 and 29 to a recording controller (not shown).

As thermal head 22 is located at the lower portion of platen roller 10 and thermal head 23 is located on one side of the platen roller with flexible cables 28 and 29 going downward, a larger space can be provided in the upper portion of housing 1 for effective use.

Pressure roller 24 is located with its axis parallel to that of platen roller 10 and rolls on the lower portion of platen roller 10. Pressure roller 25 is located behind platen roller 10 with its axis parallel to that of platen roller 10 and rolls on the side portion of platen roller 10

Pressure rollers 24 and 25 serve to prevent inclination of platen roller 10 which may occur when thermal heads 22 and 23 make contact with platen roller 10.

Each of thermal heads 22 and 23 is secured to a supporting device 30 as shown in FIG. 2. Supporting device 30 is illustrated more specifically in FIG. 3. Base 31 of supporting device 30 is U shaped, extending in the axial direction of platen roller 10 (i.e., line direction). Body 32 which is movable in the recording sheet feeding direction x with respect to base 31, is fitted in this base. Movable body 32 has its four edges of the top surface protruding, thereby forming a recessed portion in its center. Another body 33, which is movable in the line direction with respect to former movable body 32, is fitted in this recess of movable body 32. Thermal head 22 (or 23) is secured to this movable body 33.

In supporting device 30, mounting bracket 39 protrudes at the center portion of the bottom of base 31 and is mounted, by means of screw 40, on case housing 1 with the proper angle with respect to housing 1, thereby securing supporting device 30 in case housing 1. In order to accurately set the mutual positional relation between thermal heads 22 and 23 and the positional relation between these heads and platen roller 10, screws 34 located at the center portions of both sides of base 31 are loosened to adjust the position of movable body 32 in the sheet feeding direction x, after loosening screws 38. Then screws 34 are tightened to secure movable body 32. In this way, the positions of thermal heads 22 and 23 in the recording sheet feeding direction x can be adjusted. Further, screws 35 and 36 are located on one side of base 31 on the left and right sides of screw 34. The inclination of movable body 32 and those of thermal heads 22 and 23 with respect to platen roller 10 can be adjusted by loosening screws 35 and 36 to adjust the inclination of movable body 32 to base 31, then tightening screws 35 and 36 to secure movable body 32. Then, tightening screws 38 can secure movable body 32 to base 31. There is another screw 37 located on both sides of movable body 32. The position of movable body 33 in the line direction of thermal heads 22 and 23 can be adjusted by loosening screw 37 to move movable body 33 in the axial direction of platen roller 10 or the line direction of thermal heads 22 and 23, then tightening screw 37 to secure body 33.

Platen roller 10 is mounted to side plates 3*a* and 3*b* in such a manner that platen roller 10 can move between a first position where it is spaced away from both of thermal heads 22 and 23 in order to allow feeding of the continuous recording sheet roll 5, as indicated by the two-dotted chain lines in FIG. 5, and a second position where platen roller 10 contacts both thermal heads 22 and 23, as indicated by the solid line. Platen roller 10 is pushed, by a resilient member (not shown), toward the first position where it is separated from thermal heads 22 and 23. A pair of setting devices 41 for setting platen roller 10 to the second position are attached to upper cover 4 and protrudes into case housing 1, and press platen roller 10 toward thermal heads 22 and 23 against the force of said resilient member when upper cover 4 is closed. As shown in FIG. 4, each of setting device 41 comprises support portion 42 protruding toward the interior of case housing 1 from upper cover 4, arms 43 which are attached to and slide in support portion 42, roller 44 attached and rotatable to the free end of arms 43, and compression spring 45 located between support portion 42 and arms 43 to push arms 43 in the advancing direction. When cover 4 is closed, rollers 44 make contact with platen roller 10 and the resilient force of springs 45 presses platen roller 10 against thermal heads 22 and 23. Rollers 44 rotate together with platen roller 10. Closing levers 46 are provided on either side of upper cover 4 in the axial direction of platen roller 10. Engaging portions 47 (see FIG. 5) are provided on either side of the apparatus housing in association with closing lever 46. After upper cover 4 is closed, closing levers 46 are rocked to engage with or disengage from associated engaging portions 47, thereby securing upper cover 4 to housing 1 or releasing it therefrom.

As shown in FIG. 5, loop cutter 51 is provided between feed rollers 13 and 14 and feed rollers 16 and 17. Loop cutter 51 moves in the line direction of thermal heads 22 and 23 along rail 53 by the driving force transmitted via a wire (not shown) from rotational driving section 52 (see FIG. 4), and cuts continuous recording sheet 5a to provide a regular sheet of size A1 etc..

The present apparatus is provided with three sensors 55 to 57. Sensor 55, provided between feed rollers 7 and 8 and platen roller 10, detects a sheet-out state. Sensor 56, located between platen roller 10 and feed rollers 13 and 14, detects the leading edge of recording sheet 5a. Sensor 57, located downstream of feed rollers 16 and 17, detects paper jamming.

A description will now be given of the operation of the thermal recording apparatus having the above-described structure.

In setting the continuous recording sheet roll 5, upper cover 4 is opened first Opening cover 4 releases platen roller 10 from rollers 44 of setting device 41 and separates it from thermal heads 22 and 23 to be ready for recording paper setting In this state, the leading edge portion of the recording sheet fed out from recording sheet roll 5 is conveyed to platen roller 10 via feed rollers 7 and 8 and guide 9. After recording sheet 5a is inserted in the gap between platen roller 10 and thermal heads 22 and 23, upper cover 4 is closed. This causes rollers 44 of setting device 41 to press platen roller 10 against thermal heads 22 and 23, thus completing the setting of recording sheet roll 5.

When recording starts, motor 21 starts rotating and its driving force is transmitted to holder 6, feed rollers 7, 8, 13, 14, 16 and 17 and platen roller 10. As a consequence, recording sheet 5a is discharged outside from upper cover 4, passing through guides 11 and 12, feed rollers 13 and 14, guide 15, feed rollers 16 and 17 and guides 18 and 19.

Figure 3:
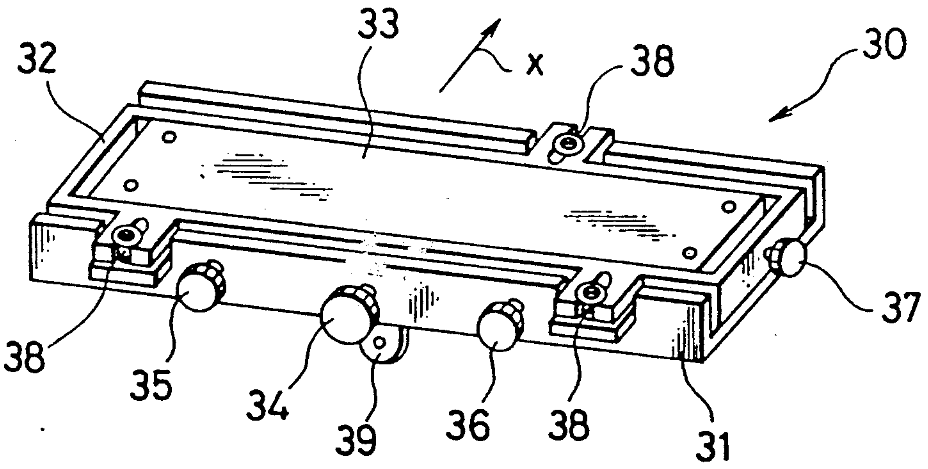

In accordance with the movement of continuous recording sheet 5a fed out from sheet roll 5, thermal heads 22 and 23 selectively render the individual elements of resistance heating element arrays 26 and 27 based on data supplied from an information processing apparatus (not shown) to form a given heat-sensitive recording image on recording sheet 5a. The left side portion of the recording image as viewed in the feeding direction (arrow x) of recording sheet 5a is formed by thermal head 22, while the right side portion of the image is formed by thermal head 23. The continuity of recording at the jointed portion of both half images can be accurately maintained by preadjusting the positions of thermal heads 22 and 23 by means of supporting device 30 as shown in FIG. 3.

Moreover, according to the present embodiment, superposed recording is effected with one to several dots overlapping in the line direction at joint portions between thermal heads adjacent to one another. Therefore, prohibitive gaps cannot be formed in the line direction. Thus, according to the present invention, even if the relative positions of the thermal heads are deviated, it entails only a small deviation of dot forming positions, and can hardly be visually noticed.

Upon completion of forming the recording image corresponding to size A1, the feeding of the recording sheet 5a is temporarily stopped and loop cutter 51 is activated to cut recording sheet 5a. Then, the leading edge of recording sheet 5a is fed back to where sensor 56 is located and the next recording starts.

According to the thermal recording apparatus of arranged at a single platen roller 10 and the continuity of recording can be maintained, thus contributing to compactness of the apparatus and reduction in the manufacturing cost.

There will now be described the second embodiment of the present invention. This embodiment ensures to reduce the superposed (overlapping) regions of the recording regions, thereby further improving the drawing quality.

Figure 6:
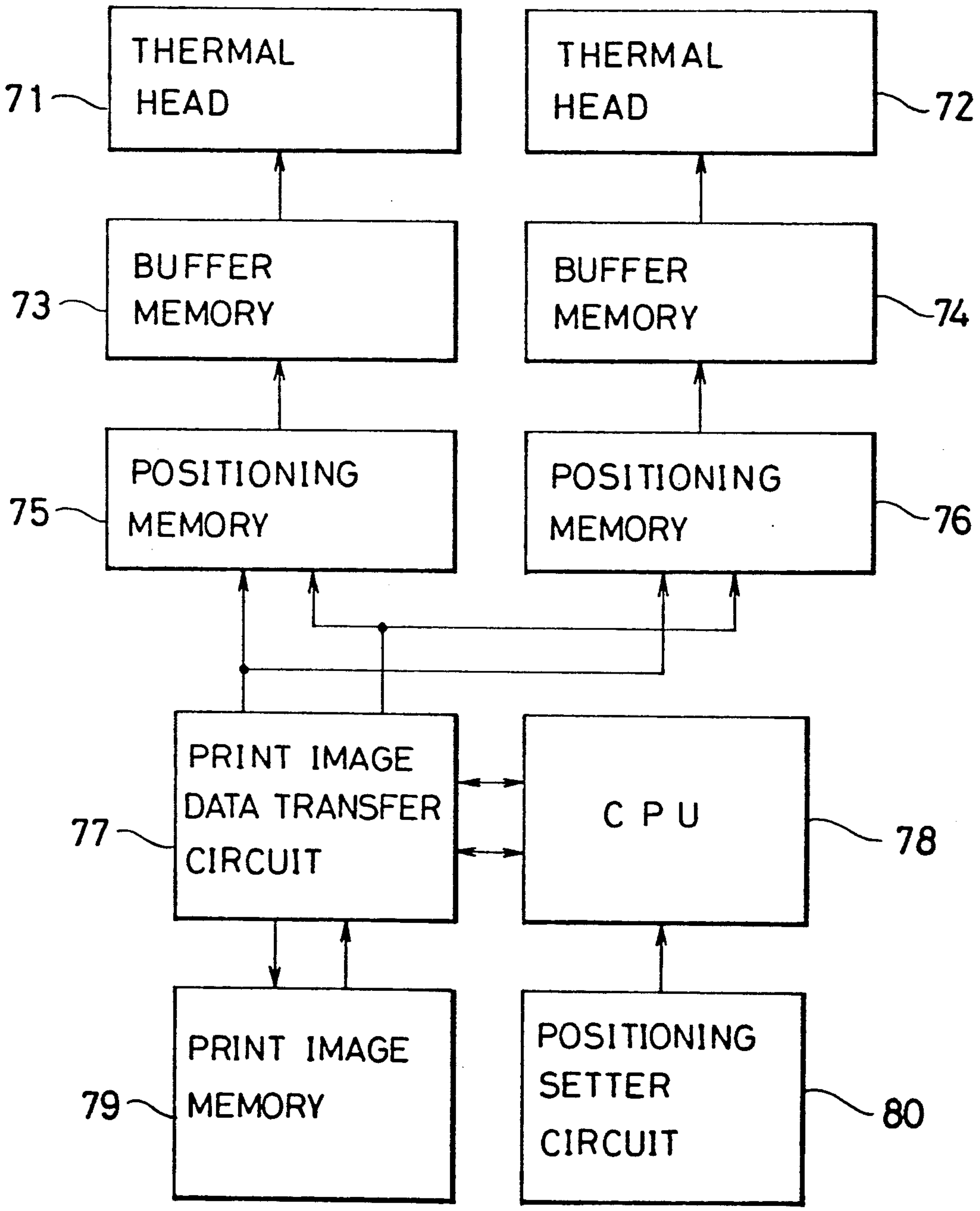
FIG. 6 is a block diagram showing the principal part of the controller provided to the thermal recording apparatus according to the second embodiment of the invention.

As shown in FIG. 6, a thermal recording apparatus according to this embodiment of the present invention comprises two thermal heads 71 and 72 of the in-line type capable of recording on size-A3 paper. These heads 71 and 72 are capable of recording on e.g. size-A1 paper as the maximum-size paper.

CPU 78 is used to control the recording region of thermal heads 71, 72. Positioning setter circuit 80 is connected to CPU 78. Circuit 80, which is composed of e.g. an EPROM (erasable programmable read-only memory), stores information for specifying preset printing positions of thermal heads 71 and 72.

Print image memory 79 is used to store print image data on the size A1. Memory 79 is connected to print image data transfer circuit 77. Circuit 77 transfers print image data on predetermined positions stored in memory 79 to assigned storage addresses of two positioning memories 75 and 76 in accordance with a transfer command from CPU 78.

Positioning memories 75 and 76 are provided corresponding to thermal heads 71 and 72, respectively, and their addresses correspond individually to the respective dot positions of heads 71 and 72. Print image data outputted from memories 75 and 76 are supplied as print information to thermal heads 71 and 72 through buffer memories 73 and 74, respectively.

Figure 7:
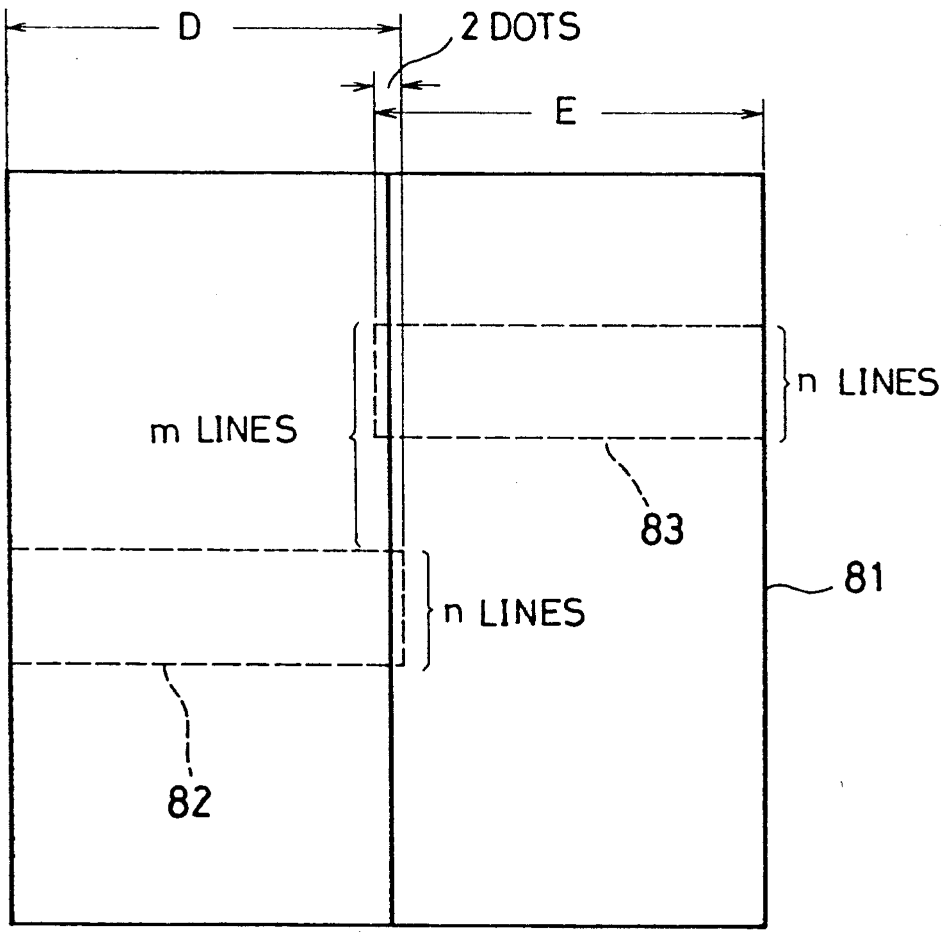
FIG. 7 is a diagram showing the relationships between the contents of a print image memory and the respective recording ranges of thermal heads.

FIG. 7 is a diagram showing the relationships between drawing plane 81, composed of the print image data stored in print image memory 79, and the recording ranges of thermal heads 71 and 72.

In FIG. 7, symbols D and E designate the ranges of recording region by means of thermal heads 71 and 72, respectively. As shown in FIG. 7, superposed recording for two-dot width is effected at joint portions between thermal heads 71 and 72. In accordance with a command from CPU 78, therefore, the print image data transfer circuit 77 transfers print image data for n-line transfer ranges 82 and 83 including the joint portions or overlapping portions, as indicated by broken lines in FIG. 7, to positioning memories 75 and 76, respectively. Transfer range 82 is shifted from transfer range 83 for m lines, which is determined by the distance between thermal heads 71 and 72.

Figure 8A:
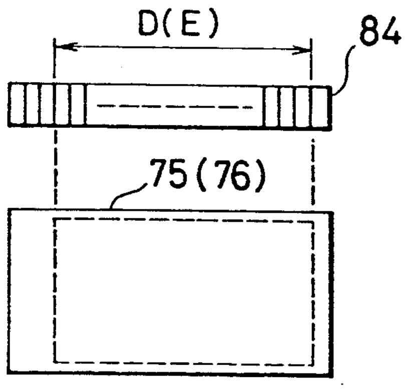
FIG. 8A and 8B are diagrams showing the relationships between positioning memories and heating element arrays in the apparatus of FIG. 6.
Figure 8B:
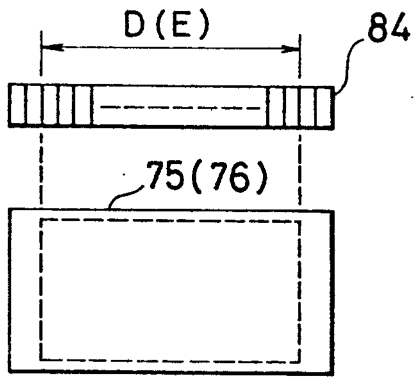

FIGS. 8A and 8B are diagrams showing the relationships between positioning memories 75 and 76 and resistance heating element arrays 84 of thermal heads 71 and 72. The length (dot number) of positioning memories 75 and 76 in the line direction is greater than recording ranges D and E of thermal heads 71 and 72. As shown in FIGS. 8A and 8B, the recording positions of thermal heads 71 to 72 can be moved by dots in the line direction, depending on the storage positions in the line direction.

The following is a description of the operation of the thermal recording apparatus according to the present embodiment constructed in this manner. Here it is to be supposed that thermal head 71 performs recording operation in advance of thermal head 72.

When printing is started, CPU 78 supplies print image data transfer circuit 77 with a source address for specifying the to-be-transferred print image data in print image memory 79, transfer range, destination addresses of positioning memories 75 and 76, along with the transfer command, thereby starting transfer operation. At the start of the transfer operation, initial addresses for recording range D is given as source address for positioning memory 75, and an address obtained by taking away an address for m lines from the initial address for recording range E is given as a source address for positioning memory 76. Further, a range for n lines is given as the transfer range, and top addresses for the positioning memories 75 and 76 set in the positioning setter circuit 80 are given as destination addresses.

On receiving the transfer command, print image data transfer circuit 77 transfers the print image data in the print image memory 79 for an assigned transfer range to assigned transfer addresses of positioning memories 75 and 76. In this case, data for n lines are transferred from the top position of recording range D to the positioning memory 75. Since the source address for positioning memory 76, however, is off drawing plane 81, null data is transferred to memory 76. The print image data for n lines are transferred en bloc in order to reduce the output frequency of the transfer command from CPU 78, thereby relieving the load on CPU 78.

The print image data transferred to positioning memories 75 and 76 are transferred by lines to the buffer memories 73 and 74, and then supplied to thermal heads 71 and 72, respectively. Thereupon, recording is performed by means of thermal heads 71 and 72. Every time the recording for n lines is accomplished, thereafter, n-line data transfer from print image memory 79 to positioning memories 75 and 76 is repeated, and printing operation is performed by means of two thermal heads 71 and 72.

Figure 9:
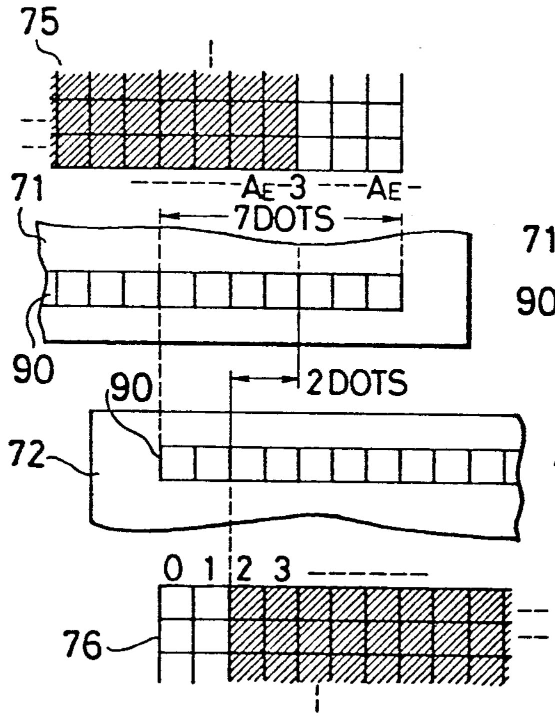
FIG. 9 and FIG. 10 are diagrams showing the relationships between the thermal heads and the positioning memories at joint portions between the thermal heads in the apparatus of FIG. 6.
Figure 10:
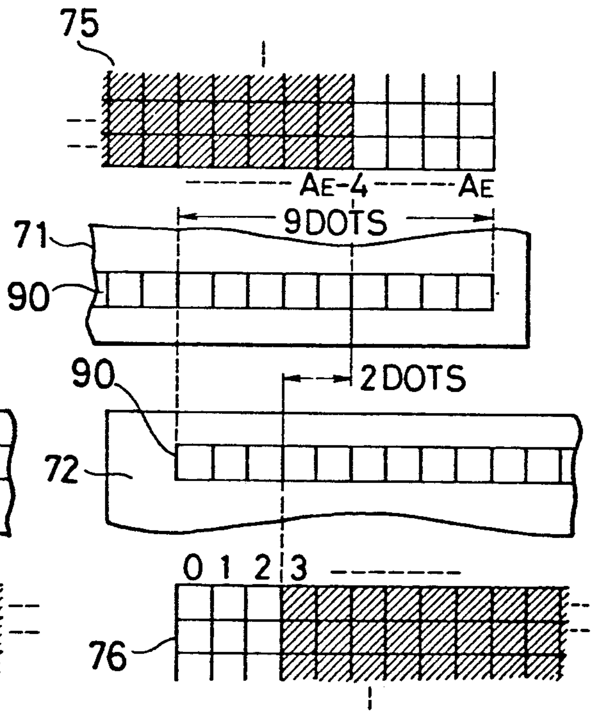

FIGS. 9 and 10 show joint portions between the recording regions of thermal heads 71 and 72 in detail. Thermal heads 71 and 72 are roughly positioned, with respect to the line direction of the resistance heating element arrays 90, by means of a position control mechanism (not shown) so that they overlap each other by a margin corresponding to about 5 to 10 dots, in the line direction. If the overlapping dots of thermal heads 71 and 72 are seven in number, and if the final address in the line direction of positioning memory 75 is "$A_E$-3", as shown in FIG. 9, the top address in the line direction of positioning memory 76 is set to "2". Likewise, if the overlapping dots of thermal heads 71 and 72 are nine in number, and if the final address in the line direction of positioning memory 75 is "$A_E$-4", as shown in FIG. 10, the top address in the line direction of positioning memory 76 is set to "3". As a result, image data are stored individually in the hatched regions of FIGS. 9 and 10, and superposed recording for two dots is effected by means of thermal heads 71 and 72.

The top addresses in the line direction of positioning memories 75 and 76 may be determined while printing a checkered pattern or the like for testing, for example, during an initial adjustment process of the thermal recording apparatus. In this case, for example, dot forming data is previously stored in the 2-dot superposed recording region, and the width of the line as a result of the printing is visually confirmed. By doing this, whether the top addresses are proper or not can be determined.

According to the thermal recording apparatus of the present embodiment, the relative deviation at the joint portion between thermal heads 71 and 72 is half the dot pitch at the maximum. If this deviation takes the form of gaps, however, they produce vertical scratches which are very conspicuous. If the deviation is caused at a region where the dots are formed, on the other hand, it leaves hardly any visible traces. In the present embodiment, the superposed recording covers the width corresponding two dots, so that no gaps can be created at the joint portions. Thus, the device of the present embodiment can ensure high drawing quality.

Although the superposed recording is effected for two-dot width in the embodiment described above, the number of dots is not limited to two, and it is necessary only that the overlapping portion cover one to several dots. In this case, the position adjustment may be facilitated if tens of dots are covered by the overlapping portion. If the overlapping dots are increased too much, however, a deviation of the dots at the overlapping portion becomes prominent. It is to be believed, therefore, that the suitable number of dots to be superposed ranges from two to four.

Figure 1:
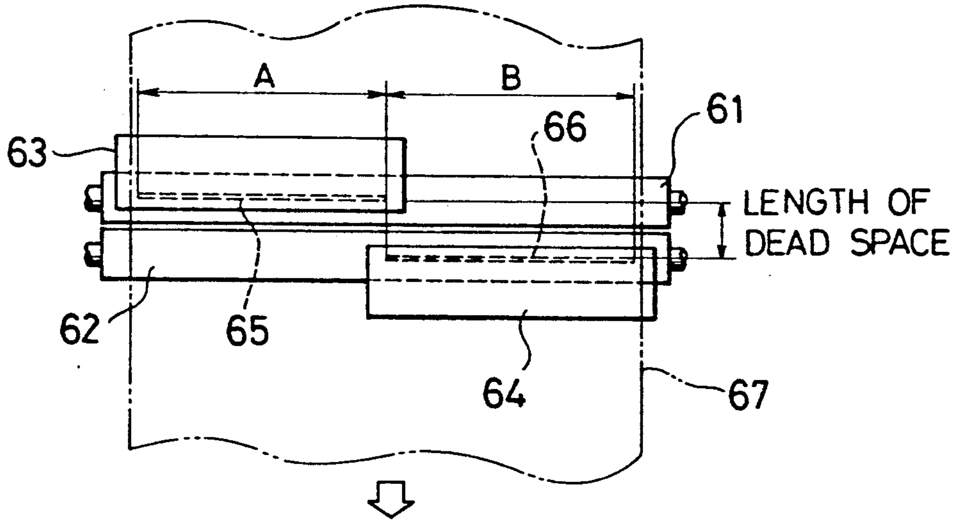
FIG. 1 is a plan view illustrating part of a conventional thermal recording apparatus.

As shown in FIGS. 2 to 5, recording sheet 5*a* should lie between platen roller 10 and both thermal heads 22 and 23 at the beginning of the recording. The apparatus of this embodiment, therefore, has dead space where no recording is possible between the contact point between platen roller 10 and upstream thermal head 23 and the contact point between platen roller 10 and downstream thermal head 22. According to the conventional apparatus, however, there is dead space formed which exceeds the sum of the diameters of platen rollers 61 and 62 as shown in FIG. 1. The conventional apparatus therefore has a narrow image forming range on a recording sheet. According to the apparatus of this embodiment, by way of contrast, although dead space is formed, it can be made smaller than the diameter of platen roller 10, thus making the effective image forming range larger than that which can be realized by the prior art.

Figure 11A:
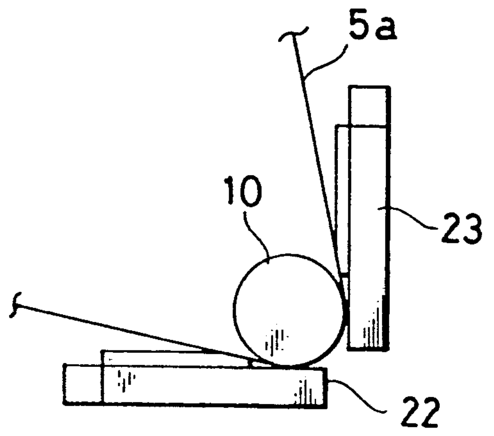
FIGS. 11A and 11B are schematic side views showing the essential portions of the thermal recording apparatus according to the third and fourth embodiments of this invention, respectively.

The present invention is in no way limited to the above-described particular embodiments. For instance, thermal heads 22 and 23 may be so arranged as to have their distal ends coming closer to each other, as shown in FIG. 11A. This can ensure effective use of space to locate both thermal heads 22 and 23 without much mutual interference and can further facilitate the positional adjustment of the thermal heads as compared with the one involved in the previous embodiments.

Figure 11B:
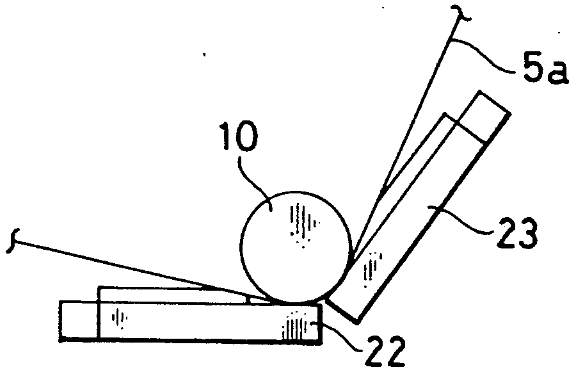

Further, the dead space may be further reduced by making the angle defined by the heating element arrays of heads 22 and 23 greater than 90°, as shown in FIG. 11B.

Figure 12:
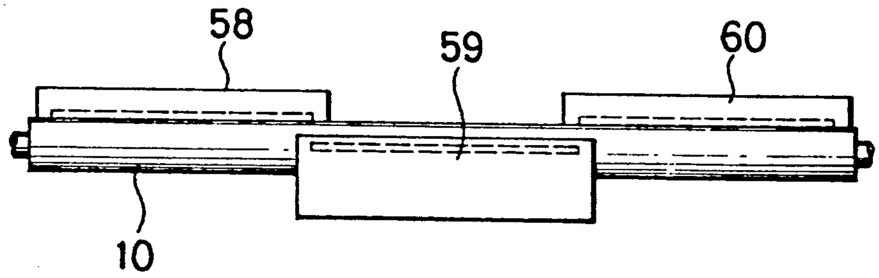
FIG. 12 is a plan view showing the essential portion of the thermal recording apparatus according to the fifth embodiment of this invention.

Furthermore, the number of the thermal heads is not limited to two as in the previous embodiments. For instance, the present invention can be applied to an apparatus for recording data on an A0-sized paper using three thermal heads 58, 59 and 60 of size A3, as shown in FIG. 12.

The present invention can be applied to a thermal transfer type recording apparatus using heat-melting ink, heat-sublimating ink as well as a heat-sensitive recording apparatus using heat-sensitive paper.

I claim:

1. A thermal printer comprising:

a platen roller;

a plurality of thermal heads located angularly displaced from each other in a circumferential direction of said platen roller and linearly displaced from one another in an axial direction of said platen roller, each of said plurality of thermal heads having a resistance heating element array extending in the axial direction of said platen roller; and a separate head supporting means for positioning each of said thermal heads in such a way that regions in which said heating element arrays perform recording have joint portions and the regions overlap at each of said joint portions, said head supporting means including a head-mounting stand on which one of said thermal heads are secured, a first holding member for holding said head-mounting stand adjustably movable in a line direction of one of said thermal heads, and a second holding member for holding said first holding member adjustably movable in a recording sheet feeding direction and in a direction for inclination with respect to said axial direction of said platen roller.

2. A thermal printer according to claim 1, wherein said first holding member has a box-like movable body where said head-mounting stand is fitted into and first screws engaged in said movable body for moving said head-mounting stand in the line direction of one of said thermal heads.

3. A thermal printer according to claim 1, wherein said second holding member has a U-shaped base which extends in the axial direction of said platen roller and supports said movable body of said first holding member, and wherein screws are engaged in side walls of said base for moving said movable body in the recording sheet feeding direction and adjusting the inclination of said movable body to said base.

4. A thermal printer according to claim 1, further comprising platen roller supporting means for supporting said platen roller movable between a first position where said platen roller is spaced away from all of said plurality of thermal heads and a second position where said platen roller contacts all of said plurality of thermal heads.

5. A thermal printer according to claim 4, further comprising a cover and urging means for urging said platen roller toward said second position when said cover is closed.

6. A thermal printer according to claim 5, wherein said urging means includes a support body secured to said cover, an arm which is supported on said support body and is able to protract and retract, a spring for urging said arm in a protracting direction, and a roller attached rotatably to said arm, said roller being able to rotate together with said platen roller.

7. A thermal printer according to claim 1, further comprising a support roller which contacts said platen roller and is rotatable together with said platen roller, said support roller supporting said platen roller for preventing inclination of said platen roller.

* * * * *